Aug. 19, 1924.
C. McCOY
1,505,101
POWER TAKE-OFF FOR MOTOR VEHICLES AND THE LIKE
Filed March 17, 1921
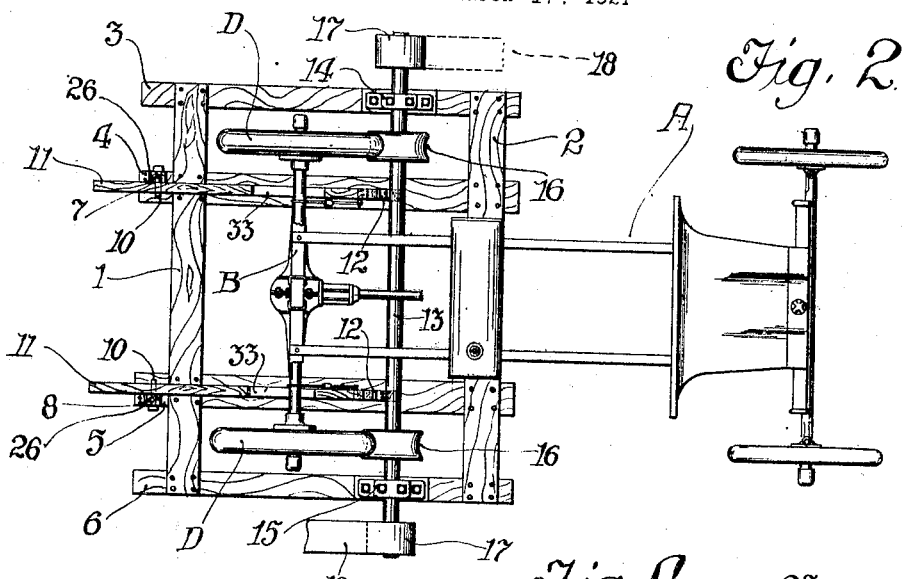
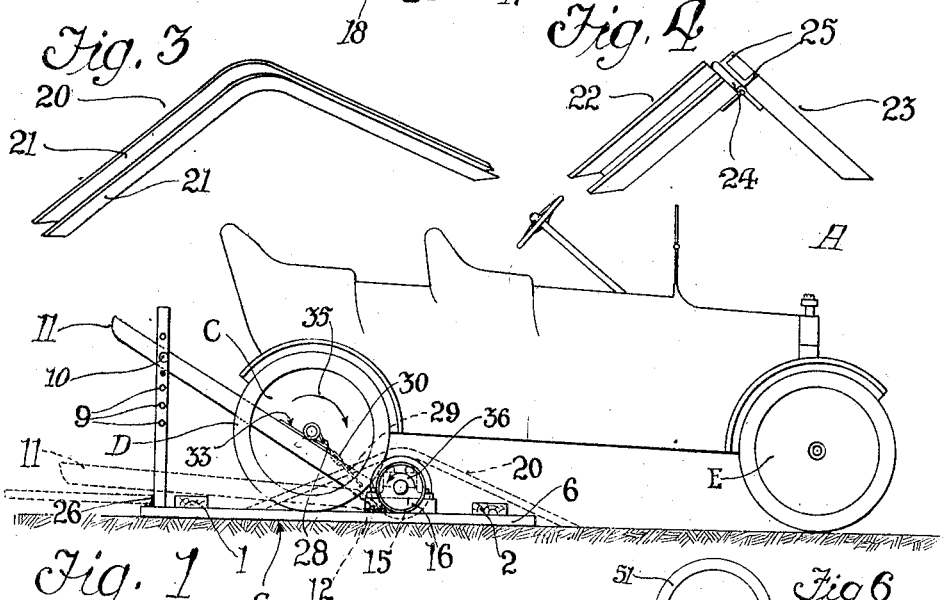
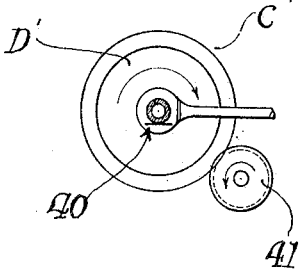
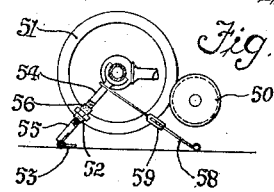
Inventor
Charles McCoy
By Brown Boettcher
Dienner attys.

Patented Aug. 19, 1924.

1,505,101

UNITED STATES PATENT OFFICE.

CHARLES McCOY, OF CHICAGO HEIGHTS, ILLINOIS.

POWER TAKE-OFF FOR MOTOR VEHICLES AND THE LIKE.

Application filed March 17, 1921. Serial No. 452,968.

*To all whom it may concern:*

Be it known that I, CHARLES McCOY, a citizen of the United States, residing at Chicago Heights, in the county of Cook and State of Illinois, have invented a certain new and useful Improvement in Power Take-Offs for Motor Vehicles and the like, of which the following is a full, clear, concise, and exact description, reference being had to the accompanying drawings, forming a part of this specification.

My invention relates to power take-offs for motor vehicles and the like, particularly to that class of take-offs adapted for driving engagement with the drive wheels of the vehicle, so that power derived from the rotation of such wheels may be taken for extrinsic use such as for example, driving a threshing machine, grinder, corn sheller, cream separator, saw or the like.

The prior art devices of this general description have been expensive, complex and unsatisfactory. Great difficulty has heretofore been experienced in securing an efficient transmission of power from the vehicle, in fact this efficiency has commonly been so low that the results secured have been most unsatisfactory. The maintenance of a proper driving engagement between the vehicle wheels and the take-off device has been another of the prior art problems, as has the positioning or arranging of the vehicle wheels in driving engagement with the take-off device. The vibrations heretofore set up in the take-off device upon the transmission of power from the vehicle wheels has presented a further practical difficulty.

According to my invention, I provide a simple and highly effective arrangement for securing an efficient transmission of power from the vehicle; I provide whereby the vibrations in the take-off device itself, as well as in the driving connection between it and the vehicle are reduced to a minimum; I provide for maintaining proper driving engagement between the vehicle wheels and the take-off device in a simple and highly effective manner; and I provide for positioning or arranging the vehicle wheels in driving engagement with the take-off device with a minimum of effort and difficulty.

In what I now consider to be the preferred embodiment of my invention, the take-off is drivingly engaged with the vehicle wheels forward of their axis of rotation. The bearings carrying the drive wheels of the vehicle during their driving engagement with the take-off device are preferably inclined toward the take-off wheels or rollers, so that proper driving engagement therebetween will be at all times assured. I provide whereby the vehicle may be driven forwardly into operative position with respect to the take-off device or may be backed into such position as desired. The engagement of the take-off device with the vehicle wheels forward of their axis of rotation not only minimizes the vibration in the take-off device, as well as in the driving connection between it and the vehicle, but provides for a more efficient delivery of power from the vehicle than heretofore possible. The inclination of the supporting bearings toward the take-off wheels or pulleys assures their proper driving engagement with the vehicle wheels at all times.

My invention aims to provide a novel, simple, compact, inexpensive, and reliable device for securing the aforesaid features and such other features as will appear from the following detailed description.

In order that those skilled in the art may be fully acquainted with the nature and scope of my invention, I shall described a specific embodiment of the invention in connection with the accompanying drawings, in which:

Figure 1 is a side elevational view of a device embodying my invention, showing a motor vehicle in driving engagement therewith.

Figure 2 is a plan view of the same, showing just the chassis of the motor vehicle;

Figure 3 is a perspective view of one of the approaches for positioning the car in driving engagement with the take-off device.

Figure 4 is a perspective view of a modified form of approach;

Figure 5 shows diagrammatically the arrangement of the take-off device forward of the axis of the drive wheels according to my invention in connection an alternate form of supporting surface for the drive axle; and Figure 6 shows diagrammatically still another arrangement for supporting the drive wheels in raised position.

Referring now to the drawings, the motor vehicle A is provided with the usual drive axle housing B. Associated with the drive axle are the drive or traction wheels C provided with the usual pneumatic or solid tires D and it is with the taking of power from the wheels C for extrinsic use that my invention is concerned. While the motor vehicle shown is an automobile of popular make, it is to be understood that the device of my invention is adapted for use with motor vehicles of various types and makes. The modifications and changes that may be desirable in adapting the fundamental principles of my invention to various vehicles are contemplated and permissible without departing from my invention, which is set out in the appended claims.

The power take-off arrangement comprises a rectangular frame consisting of frame members 1 and 2 extending transversely across and secured to a plurality of longitudinal frame members 3, 4, 5 and 6. This frame provides a firm base, supporting a pair of uprights 7 and 8 preferably hinged at their lower ends as shown at 26 to the rear or after ends of the longitudinal frame members 4 and 5. The uprights 7 and 8 are provided with aligned sockets or openings 9 for receiving and carrying the vertically adjustable pins or pegs 10 which pins or pegs support the free ends of a pair of carrying levers 11—11 hinged at their forward ends to the longitudinal frame members 4 and 5 as shown at 12—12.

A shaft 13 is journaled in suitable bearings 14 and 15 mounted upon the longitudinal frame members 3 and 6 respectively. These bearings may be of any desired formation. The shaft 13 carries take-off wheels 16 adapted for driving engagement with the tires D of the wheels C of the vehicle. The take-off shaft 13 is driven from the vehicle through these take-off wheels 16, which wheels while preferably grooved as shown to provide maximum engagement with the wheels of the vehicle need not, of course, be so formed. They might be of the usual flat face, or any other desired type. They might even be provided with transverse corrugations well known in the art to give the tires a better grip or frictional engagement therewith if so desired. Pulleys 17 fixed upon the opposite ends of the shaft 13 provide for transmitting power as through suitable belts 18 to any desired place or to any desired machine or devices for driving the same.

In arranging the vehicle wheels C in driving engagement with the take-off pulleys 17, inclined approaches which approaches may be in the nature of channel iron 20 curved or bent to the desired inclination and having upright marginal flanges 21 as shown in Figure 3, or may comprise channel boards 22 and 23 joined by suitable hinges 24 and provided with suitable upright marginal flanges 25 or may be of any other desired formation are arranged over the take-off wheels 16 as shown in dotted lines in Figure 1. The uprights 7 and 8 are then swung about the hinges 26 into their horizontal position shown in dotted lines in Figure 1 and the car driven forwardly into substantially the position shown; the front wheels E of the car traveling over the approaches 20 upon such movement. The approaches 20, the front wheels of the car having been directed over the take-off wheels 16 thereby, are then removed and the carrying levers 11—11 then raised either manually or by suitable power application means if so desired sufficiently to engage the axle housing B and lift the rear drive wheels C—C from the surface S of the ground slightly. The inclined supporting surface thereby provided for the axle housing B by the levers 11—11 will thereupon direct the wheels C—C down into positive driving engagement with the take-off wheels 16, so that by driving these wheels in the usual manner from the power plant or motor of the vehicle, the shaft 13 and consequently the pulleys 17 carried thereby will be driven so that power may be taken therefrom as hereinbefore set forth. Those portions of the upper surfaces of the levers 11 which cooperate with the axle of the car to lift the rear of the same from the surface of the ground are preferably faced with suitable facing plates or strips 33.

The carrying levers 11—11 are preferably long enough to provide sufficient leverage for lifting the car independently of the use of other jacks or lifting appliances, although this is not necessary and such appliances may be used if so desired. Upon raising the rear axle B and associated drive wheels to the desired point, the levers 11—11 are secured at such inclination by inserting the pins or pegs 10 into the particular sockets or openings 9 registering with the levers at such inclination.

The inclined supporting surfaces provided by the levers 11—11 for the axle B is preferably sufficient to impose the required driving pressure or frictional engagement between the tires D of the wheels C and the take-off wheels 16. The frictional engagement may obviously be increased or decreased as desired by swinging the levers 11—11 about their hinged ends to vary their angle of inclination, according to the frictional engagement desired. However, if additional driving pressure between the automobile wheels and the take-off wheels is desired as when the weight of the car is relatively light and the load imposed by the machine or devices to be driven is relatively great an arrangement of straps 28 and 29 secured to the axle B and the levers 11 respectively and connected at their adjacent ends by suitable turn buckles 30 may be provided for imposing such additional driving pressure.

From the foregoing, it will be apparent that I have provided a novel, simple, compact, and inexpensive take-off arrangement in driving engagement with which the vehicle may be easily positioned; that I have provided for maintaining positive driving engagement of the vehicle wheels with the take-off device and for securing maximum power from the vehicle for extrinsic use. It should be noted that upon starting the engine of the car with the gears in forward, the rotation of the rear drive wheels C will be in the direction of the arrow 35 (Figure 4) driving the cooperating take-off wheels 16 by reason of their arrangement forward of the axis of the drive wheels in the direction of the arrow 36. Thus not only is a better and more efficient driving engagement had between the wheels C and the pulleys 17 and consistently a more efficient transmission of power from the wheels, but the take-off device is held against kicking up and the vibrations thereby reduced to a minimum.

While the car is preferably driven forwardly into position for driving engagement with the take-off device, the automobile may be backed into such position if so desired. In such case, the rear wheels C would travel over the approaches 20 into position to be engaged by the carrying levers 11 and jacked into driving engagement with the take-off wheels 16, or the inclined supporting surfaces provided by the levers 11 might even be fixed and the car backed up thereupon if so desired. In either event, the inclined supporting surfaces for the drive axle may be additionally braced within their lengths should the weight of the vehicle make it necessary as in the case of a truck.

The features of arranging the take-off wheels in driving engagement with the vehicle wheels forward of the axis of rotation of the vehicle wheels is a highly important aspect of my invention as is the inclining of the axle supporting surfaces for directing the vehicle wheels down into positive driving engagement with the take-off device. Arrangement of the take-off device forward of the axis of rotation of the drive wheels of the vehicle is highly advantageous even when the drive wheels are supported in raised position by a horizontal or level bearing as shown at 40 in Figure 5. In this case, as before, the take-off pulleys 41 are arranged in driving engagement with the tire D' of the wheels C' forward of the axis of rotation thereof. The inclined bearing surfaces might even be used to advantage with another arrangement of the take-off device with respect to the axis of the drive wheels.

Referring now to Figure 6, the take-off wheel 50 is arranged in driving engagement with the drive wheel 51 forward of the axis of rotation thereof as before. However, in this instance, the drive wheel 51 is supported in raised position by an arm 52 preferably hinged at its lower end as shown at 53 to the base frame or other supporting surface so as to allow the weight of the vehicle to maintain the proper driving engagement between the wheel 51 and the take-off wheel 50 irrespective of the size of the wheels or of the inflation of the tire of the vehicle wheel where pneumatic tires are used. Clearly, the arm 52 may be designed to raise the vehicle wheel, as well as to support the same in raised position as by threading the adjacent ends of the arm sections 54 and 55 in an adjusting sleeve 56 so that by turning such sleeve, the wheel 50 is raised or lowered. Of course, the arm 52 may be formed simply in one piece if so desired. As before, straps 58 and the turn buckle 59 may be provided for imposing additional driving pressure between the cooperating wheels and for bracing the arm 52.

Where truss rods or other obstructions are arranged below the drive axle of the vehicle as is frequently the case, the supporting or bearing surfaces for lifting and thereafter carrying the same may be slotted or otherwise formed to reach around such obstructions and engage the axle or suitable blocks may be arranged between the obstruction and the axle as desired. Of course, if the obstruction is strong enough to carry the vehicle, the supporting or carrying surfaces may even be arranged directly in engagement with the obstruction, instead of with the axle.

I claim:

1. In combination, a motor vehicle drive wheel, a driven wheel adapted for driving engagement with said drive wheel, means directing said drive wheel along a path approaching said driven wheel, said means being adjustable to change said path and thereby the driving engagement between the drive wheel and the driven wheel.

2. In combination, a hinged arm for raising and supporting a drive wheel in raised position, power take-off means for driving engagement with said drive wheel forward of its axis of rotation, said hinged raising and carrying arm being adapted to be adjusted about its pivot and secured in adjusted position to vary the frictional engagement between the drive wheel and the take-off means.

3. In combination, a base frame, a power take-off shaft carried thereby, take-off wheels on said shaft for driving engagement with the driving wheels of a motor vehicle, arms hinged to said base frame and adapted to extend back beneath the axle of the vehicle, said arms being adapted to be swung about their hinged connection to raise the vehicle wheels from the surface of the ground, the weight of the vehicle directing said vehicle wheels into positive driving engagement with said take-off wheels.

4. In combination, a base frame, a power take-off shaft carried thereby, take-off wheels on said shaft for driving engagement with the driving wheels of a motor vehicle, arms hinged to said base frame and adapted to extend back beneath the axle of the vehicle, said arms being adapted to be swung about their hinged connection to raise the vehicle wheels from the surface of the ground, means for supporting said arms in raised position, said arms being adapted to permit the weight of the vehicle to impose the desired driving pressure between the vehicle and take-off wheels.

5. In combination, a frame, a power take-off shaft carried thereby, take-off wheels on said shaft for driving engagement with the drive wheels of a motor vehicle forward of their axis of rotation, means for directing the vehicle wheels over said take-off wheels into position for driving engagement therewith, arms hinged to said base frame and adapted to extend back beneath the axle of the vehicle, said arms being adapted to be swung about their hinged connection to raise the vehicle wheels from the surface of the ground, said arms being thereupon inclined toward said take-off wheels to maintain the vehicle and take-off wheels in proper driving engagement.

6. In a power take-off for automobiles, a power take-off pulley, a friction drive wheel, and means engageable with the rear axle of an automobile for supporting the rear wheel of the automobile in raised position, said supporting means directing said rear wheel along a path approaching the friction drive wheel to maintain the forward part of said rear wheel in contact with said friction drive wheel.

7. In a power take-off device, means for supporting the drive wheel of a vehicle in raised position, power take-off means for driving engagement with the vehicle drive wheel forward of its axis of rotation, said supporting means including means inclined upwardly and rearwardly from the power take-off means and directing the vehicle wheel downwardly and forwardly into driving engagement with the take-off means.

8. In a power take-off device, a supporting frame, power take-off means carried thereby and adapted for driving engagement with the drive wheel of a vehicle, and an arm hinged to said supporting frame and adapted for supporting the vehicle wheel in raised position and directing the vehicle wheel along a path approaching the take-off means and into driving engagement with the take-off means forward of the axis of rotation of the vehicle wheel.

In witness whereof, I hereunto subscribe my name this 12th day of March, 1921.

CHARLES McCOY.